United States Patent
Akashi et al.

(10) Patent No.: US 10,250,095 B2
(45) Date of Patent: Apr. 2, 2019

(54) ROTATING ELECTRICAL MACHINE COIL

(71) Applicant: MEIDENSHA CORPORATION, Tokyo (JP)

(72) Inventors: Yasuyuki Akashi, Tokyo (JP); Taemi Tadokoro, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 15/554,805

(22) PCT Filed: Mar. 2, 2016

(86) PCT No.: PCT/JP2016/056408
§ 371 (c)(1),
(2) Date: Aug. 31, 2017

(87) PCT Pub. No.: WO2016/140260
PCT Pub. Date: Sep. 9, 2016

(65) Prior Publication Data
US 2018/0054104 A1 Feb. 22, 2018

(30) Foreign Application Priority Data
Mar. 5, 2015 (JP) ................................. 2015-043221

(51) Int. Cl.
*H02K 3/40* (2006.01)
*H02K 3/34* (2006.01)
*H02K 3/30* (2006.01)

(52) U.S. Cl.
CPC ................ *H02K 3/40* (2013.01); *H02K 3/30* (2013.01); *H02K 3/34* (2013.01); *H02K 2203/15* (2013.01); *H02K 2213/03* (2013.01)

(58) Field of Classification Search
CPC .................................... H02K 3/40; H02K 3/30
(Continued)

(56) References Cited

U.S. PATENT DOCUMENTS 3,483,413 A * 12/1969 Logan ..................... H02K 3/38
174/120 R
5,721,397 A * 2/1998 Weinberg ............... H01B 3/422
174/110 N (Continued)

FOREIGN PATENT DOCUMENTS

| CN | 1625828 A | 6/2005 |
| CN | 1666303 A | 9/2005 |

(Continued)

OTHER PUBLICATIONS https://www.engineeringtoolbox.com/thermal-conductivity-d_429.html.*
Chinese Office Action, dated Feb. 27, 2018, 7 pages.
European Extended Search Report, dated Mar. 7, 2018, 8 pages.

*Primary Examiner* — Terrance L Kenerly
(74) *Attorney, Agent, or Firm* — Foley & Lardner LLP

(57) ABSTRACT

According to the present invention, a wire insulation layer (112) and an interlayer insulation layer (113) are formed on a wire (111). A main insulation layer (114) is formed by winding highly thermally conductive mica tape. A first outer insulation layer (115) formed from heat-shrinking material and a second outer insulation layer (116) formed from a highly thermally conductive resin are formed at a coil end section. Due to this configuration, the thermal conductivity of the coil, particularly of the coil end section, is improved, thereby enabling improved cooling performance.

3 Claims, 3 Drawing Sheets

(58) Field of Classification Search
USPC .......................................... 310/196, 201, 215
See application file for complete search history.

(56) References Cited

U.S. PATENT DOCUMENTS

| | | |
|---|---|---|
| 2005/0104252 A1 | 5/2005 | Hirai et al. |
| 2005/0208301 A1 | 9/2005 | Okamoto et al. |
| 2009/0197102 A1 | 8/2009 | Okamoto et al. |
| 2011/0011124 A1* | 1/2011 | Matsuura ............... C09K 5/045 62/468 |
| 2011/0072641 A1* | 3/2011 | Baumann ................. H02K 3/38 29/596 |
| 2014/0353000 A1 | 12/2014 | Yin et al. |
| 2015/0325333 A1* | 11/2015 | Muto ..................... H01B 3/308 428/216 |
| 2016/0247595 A1* | 8/2016 | Song ....................... H01B 3/04 |

FOREIGN PATENT DOCUMENTS

| | | | |
|---|---|---|---|
| CN | 104217795 A | 12/2014 | |
| EP | 1 478 082 A1 | 11/2004 | |
| GB | 1 169 193 A | 10/1969 | |
| JP | 49-16122 A | 4/1974 | |
| JP | 54-60401 A | 5/1979 | |
| JP | 58-43152 A | 3/1983 | |
| JP | 5-199690 A | 8/1993 | |
| JP | 2001-231206 A | 8/2001 | |
| JP | 2004-349115 A | 12/2004 | |
| JP | 2005199562 * | 7/2005 | ............... B23B 7/02 |
| JP | 2012-100458 A | 5/2012 | |
| JP | 5159812 B2 | 3/2013 | |
| WO | WO 2004/006271 A1 | 1/2004 | |

* cited by examiner

ROTATING ELECTRICAL MACHINE COIL

TECHNICAL FIELD

The present invention relates to a rotating electrical machine coil and is devised by employing a unique material as an insulation material for the coil insulation layer such that the cooling performance, in particular, of the coil end portion is improved.

BACKGROUND ART

Since a large current of several thousand amperes or more flows in the generator during operation, the generator is cooled typically using a refrigerant such as air, hydrogen, and water, in order to prevent overheating. Without cooling, the temperature would rise by at least 100° C. or more, deteriorating a resin material included in the generator, which causes a failure. For this reason, the cooling is a very important technique.

Here, a structure of a conventional stator coil of a generator will be described.

FIG. 4 is a cross-sectional view illustrating a stator coil 10 of a generator according to a conventional technique. As illustrated in the figure, a wire insulation layer 12 is formed on the outer circumferential surface of a wire 11. Four wires 11, each covered with the wire insulation layer 12, form a wire bundle. Formed on the outer circumferential surface of this wire bundle (portions of the wire insulation layers 12 corresponding to the outer circumferential surface of the wire bundle) is an interlayer insulation layer 13.

A wire group is formed by four wire bundles juxtaposed together, each bundle having the interlayer insulation layer 13 formed thereon. Formed on the outer circumferential surface of this wire group (portions of the interlayer insulation layers 13 corresponding to the outer circumferential surface of the wire group) is a main insulation layer 14.

Formed on the outer circumferential surface of the main insulation layer 14 is an outer-layer insulation layer 15. The outer-layer insulation layer 15 protects the main insulation layer 14 from dust, moisture, voltage between coils, and the like.

A mica tape is generally used for an insulation layer such as the main insulation layer 14 of the stator coil 10. The mica tape is a tape in which glass fiber or resin material is used as a base material, which is dredged with mica powder and pasted together with adhesive. Since mica has an excellent insulation property, the use of a mica tape reduces the amount of coil insulation material.

Next, descriptions will be provided with reference to Patent Documents 1 and 2 for a conventional cooling method for a coil of a rotating electrical machine such as a generator.

Note that a portion of a coil positioned inside an iron core (inside slots formed in the iron core) is referred to as a coil side portion, and a portion of the coil positioned outside the iron core (outside the slots formed in the iron core) is referred to as a coil end portion.

As for how to improve the cooling performance of the coil side portion of a coil, as indicated in Patent Document 1 (Japanese Patent No. 5159812), an insulation material having high thermal conductivity is used as a material of an insulation layer of the coil side portion to improve the cooling performance.

On the other hand, as for the cooling of the coil end portion, as indicated in Patent Document 2 (Japanese Patent Application Publication 2012-100458), it is common to control the flow of the refrigerant to improve the cooling performance.

Since the coil end portion is not in contact with a metal (iron core), and in addition, has a problem that the adhesion between the coil insulation materials is poor, which tends to cause a gap, the cooling performance cannot be improved so much even if an insulation material having a high thermal conductivity is used at the coil end portion. For this reason, to cool the coil end portion, the coil end portion is adapted to be exposed efficiently to the refrigerant by controlling the flow of the refrigerant.

PRIOR ART DOCUMENT

Patent Document

Patent Document 1: Japanese Patent No. 5159812
Patent Document 2: Japanese Patent Application Publication 2012-100458

SUMMARY OF THE INVENTION

Problems to be Solved by the Invention

Here, improving the cooling performance of the coil end portion should improve the cooling efficiency inside the iron core. For example, in the case of air cooling, improving the cooling performance of the coil end portion makes it possible to lower the temperature of the coil with a smaller air flow rate. If the flow rate in the coil end portion can be reduced, the air flow rate inside the iron core can be increased accordingly. As a result, it is possible to improve the cooling efficiency inside the iron core.

For this reason, if the thermal conductivity of the insulation layer at the coil end portion is improved paying attention in particular to the insulation material, it possible to improve the cooling performance of not only the coil end portion but also a rotating electrical machine including the inside of the iron core.

However, conventionally, there has been no technique to improve efficiently the thermal conductivity of the insulation layer of the coil end portion.

In view of the above circumstances, an object of the present invention is to provide a rotating electrical machine coil in which the thermal conductivity of the insulation layer of the coil end portion is efficiently improved, and thereby the cooling performance of the rotating electrical machine including the coil end portion and the inside the iron core is improved.

Means for Solving the Problems

To achieve the above object, the present invention is
a rotating electrical machine coil in which a main insulation layer is arranged on an outer circumferential side of a plurality of wires, characterized in that
the main insulation layer is formed by winding a highly thermally conductive mica tape,
a first outer-layer insulation layer made of a heat-shrinkable material is formed on an outer circumferential surface of the main insulation layer at a coil end portion of the coil, and
a second outer-layer insulation layer made of a highly thermally conductive resin material is formed on an outer circumferential surface of the first outer-layer insulation layer at the coil end portion of the coil.

In addition, the present invention is characterized in that the highly thermally conductive mica tape is a mica tape including a highly thermally conductive material.

In addition, the present invention is characterized in that a thermal conductivity of the highly thermally conductive mica tape is 0.4 to 1.2 W/mK.

In addition, the present invention is characterized in that the heat-shrinkable material is a heat-shrinkable polymer material tape.

In addition, the present invention is characterized in that the highly thermally conductive resin material is liquid crystal polymer or highly thermally conductive polyphenylene sulfide, or a material in which a resin material is mixed with a filling material having a high thermal conductivity.

Effect of the Invention

According to the present invention, it is possible to improve the thermal conductivity, in particular, of the coil end portion of a rotating electrical machine coil, and thereby improve the cooling performance of not only the coil end portion but also the entire electrical machine including the coil side portion.

MODE FOR CARRYING OUT THE INVENTION

Hereinafter, a rotating electrical machine coil according to the present invention will be described in detail based on an example.

Example

Figure 1:
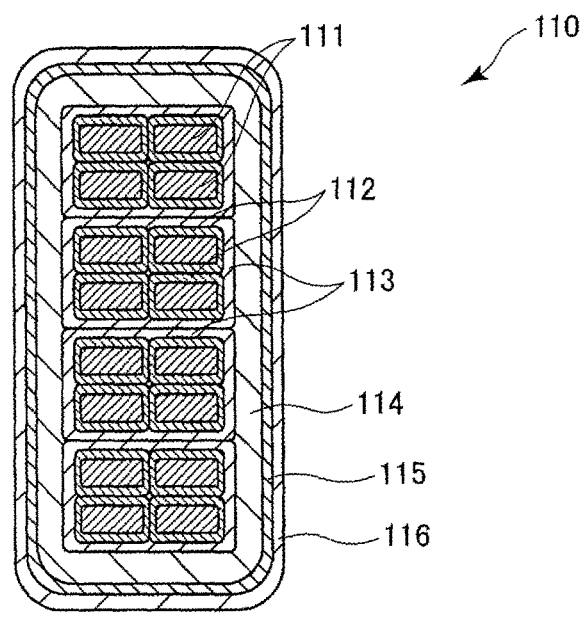
FIG. 1 is a cross-sectional view illustrating a coil end portion of a stator coil of a generator according to an example of the present invention.

FIG. 1 is a cross-sectional view illustrating a coil end portion of a stator coil 110 of a generator according to the present invention. As illustrated in the figure, formed on the outer circumferential surface of a wire 111 is a wire insulation layer 112. Four wires 111, each covered with the wire insulation layer 112, form a wire bundle. Formed on the outer circumferential surface of this wire bundle (portions of the wire insulation layers 112 corresponding to the outer circumferential surface of the wire bundle) is an interlayer insulation layer 113.

A wire group is formed by four wire bundles juxtaposed together, each bundle having the interlayer insulation layer 113 formed thereon. Formed on the outer circumferential surface of this wire group (portions of the interlayer insulation layers 113 corresponding to the outer circumferential surface of the wire group) is a main insulation layer 114. In other words, the main insulation layer 114 is arranged on the outer circumferential side of the multiple wires 111.

This main insulation layer 114 is formed by winding a highly thermally conductive mica tape. The highly thermally conductive mica tape is a mica tape including highly thermally conductive material (highly thermally conductive filler material) such as hexagonal boron nitride, which is commercially available.

The highly thermally conductive mica tape has a thermal conductivity of around 0.6 W/mK, which is 1.5 times as high as that of a conventional mica tape, and the thermal conductivity as an insulation system is improved to about twice that of the conventional one.

Note that as there is also a highly thermally conductive mica tape employing aluminum oxide, beryllium oxide, magnesium oxide, aluminum nitride, silicon carbide or the like as highly thermally conductive filler. Depending on the type or the amount of highly thermally conductive filler material, the thermal conductivity of the highly thermally conductive mica tape ranges from 0.4 to 1.2 W/mK.

Thus, such a highly thermally conductive mica tape may be used to form the main insulation layer 114.

At the coil end portion of the stator coil 110, a first outer-layer insulation layer 115 is formed on the outer circumferential surface of the main insulation layer 114. The first outer-layer insulation layer 115 is formed from heat-shrinkable material. For this heat-shrinkable material, a heat-shrinkable polymer material tape can be used, such as a heat-shrinkable polyester tape, a PET (polyethylene terephthalate) tape, or the like.

Since the process of manufacturing stators of a generator includes a heat treatment step such as heat compression, vacuum pressure impregnation or the like, the first outer-layer insulation layer 115 formed from a heat-shrinkable material shrinks by heat in the heat treatment step, and tightens the main insulation layer 114.

Assuming that the linear expansion coefficient of the mica tape is $30 \times 10^{-6}$ m/°C. as a general figure, if the stator coil 110 is heated to 100° C., the expansion coefficient of the main insulation layer 114 is 1 to 2% per 1 mm of the insulation layer. Compared to this, because the expansion coefficient of the heat-shrinkable tape is 3% or more, the first outer-layer insulation layer 115 has an effect of preventing reduction of adhesion and occurrence of gaps, which may be caused due to expansion of the mica tape, as well as filling minuscule gaps initially created.

Note that the first outer-layer insulation layer 115 can be formed by winding a polyether ether ketone (PEEK) tape or a polyolefin tape.

At the coil end portion of the stator coil 110, a second outer-layer insulation layer 116 is formed on the outer circumferential surface of the first outer-layer insulation layer 115. The second outer-layer insulation layer 116 is formed from a highly thermally conductive resin material.

For the highly thermally conductive resin material, for example, liquid crystal polymer (LCP), highly thermally conductive polyphenylene sulfide (PPS), or the like can be used.

The highly thermally conductive PPS has a thermal conductivity of 28.5 W/m·K. This value is similar to that of a metal having a relatively less thermal conductivity such as titanium and is larger than that of polyethylene (0.5 W/m·K or less) or glass fiber (1.0 W/m·K or less) used for a typical outer layer of a coil end portion of a generator.

For the highly thermally conductive resin material, a material can be used in which a general resin material such as polypropylene, polycarbonate (PC), polyamide (PA), or the like is mixed with a filling material such as aluminum oxide.

As described above, in this embodiment, since the main insulation layer 114 is formed by winding the highly thermally conductive mica tape, the main insulation layer 114 has a high thermal conductivity and is capable of cooling the coil end portion effectively.

In addition, the use of a heat-shrinkable material for the first outer-layer insulation layer 115 allows for compression of the insulation materials such as the main insulation layer 114, improving adhesion between the insulation materials, thereby preventing deterioration of the thermal conductivity.

Moreover, by using a highly thermally conductive resin material for the outermost second outer-layer insulation layer 116, it is possible in the same way as in a coil side portion to obtain a thermal conductivity equivalent to metal (iron core) contact also in the coil end portion.

With the insulation structure according to the above, this example improves the thermal conductivity of the coil end portion and further improves the cooling performance of the entire stator of the generator.

Next, the cooling performance of the coil end portion according to the above example will be evaluated.

Figure 2:
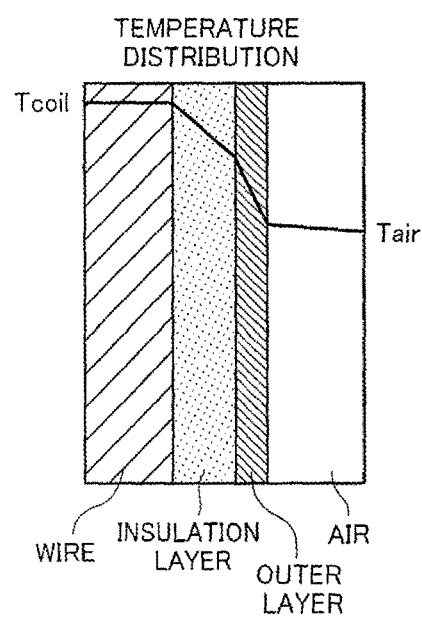
FIG. 2 is a conceptual diagram illustrating a concept related to thermal conduction of the coil side portion.

FIG. 2 illustrates a concept related to thermal conduction of the coil end portion.

Figure 3A:
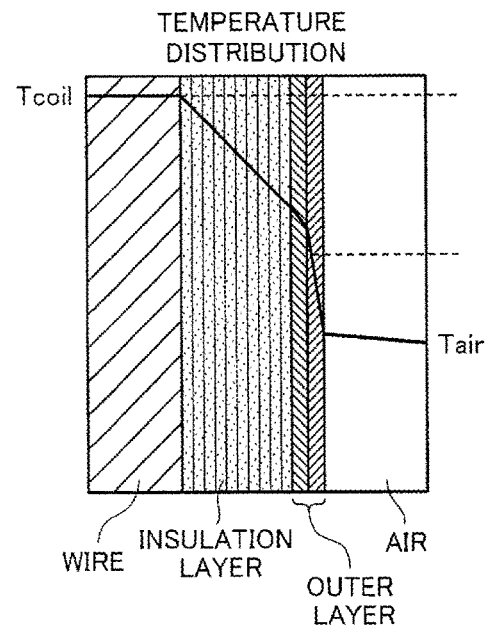
FIG. 3A is a conceptual diagram illustrating a concept related to thermal conduction of the coil end portion, which illustrates a concept of thermal conduction of a high thermal conductivity insulation system.
Figure 3B:
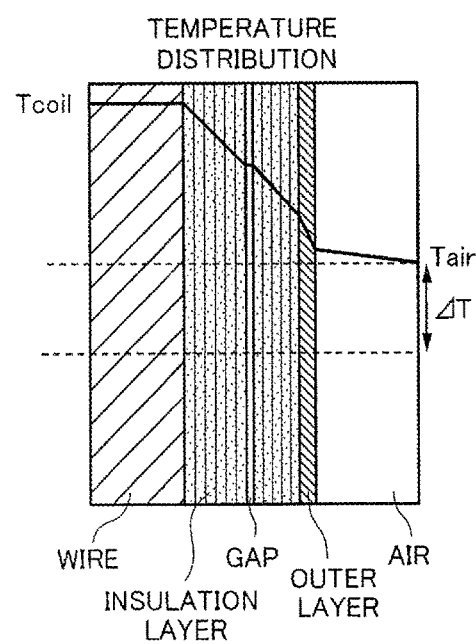
FIG. 3B is a conceptual diagram illustrating a concept related to thermal conduction of the coil side portion, which illustrates a concept of thermal conduction of a conventional insulation system.
Figure 4:
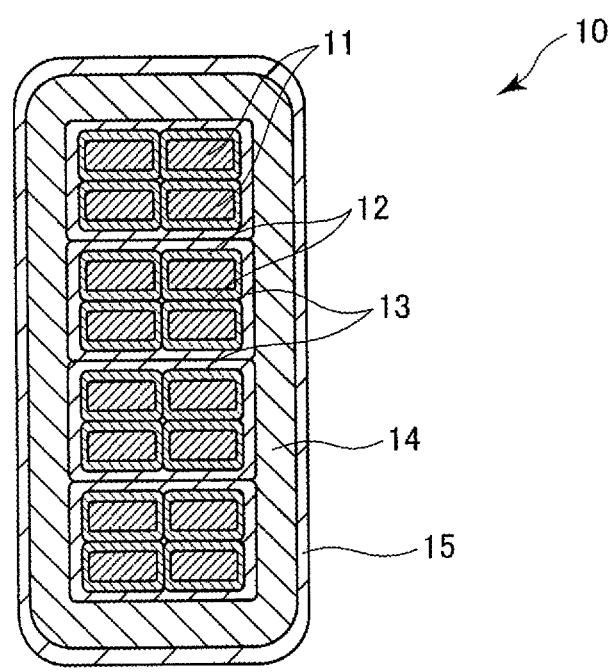
FIG. 4 is a cross-sectional view illustrating a stator coil of a generator according to a conventional technique.

FIG. 3A illustrates a concept of thermal conduction of such high thermal conductivity insulation system as illustrated in FIG. 1, and FIG. 3B illustrates a concept of thermal conduction of a conventional insulation system.

When the Fourier's law is applied to each insulation layer, formulae (1) and (2) are obtained.

For the high thermal conductivity insulation system $$dQ_1 = \lambda_1 \cdot dA_1/dx_1(T_{air} - T_{coil}) \quad (1),$$

for the conventional insulation system $$dQ_2 = \lambda_2 \cdot dA_2/dx_2(T_{air} - T_{coil}) \quad (2)$$

where
$Q_1$: the amount of heat transfer of the high thermal conductivity insulation system [W],
$Q_2$: the amount of heat transfer of the conventional insulation system [W],
$\lambda_1$: thermal conductivity of the high thermal conductivity insulation system [W/m·K],
$\lambda_2$: thermal conductivity of the conventional insulation system [W/m·K],
$A_1$: area of the high thermal conductivity insulation system [m$^2$],
$A_2$: area of the conventional insulation system [m$^2$],
$x_1$: insulation thickness of the high thermal conductivity insulation system [m],
$x_2$: insulation thickness of the conventional insulation system [m],
$T_{air}$: temperature of air [° C.], and
$T_{coil}$: temperature of the wire [° C.].

These can be transformed into (3) and (4).
From the formula (1)

$$dQ_1/dA_1(dx_{1mica}/\lambda_{1mica} + dx_{pet}/\lambda x_{pet} + dx_{pps}/\lambda x_{pps}) = (T_{air} - T_{coil}) \quad (3),$$

from the formula (2)

$$dQ_2/dA_2(dx_{2mica}/\lambda_{2mica} + dx_{air}/\lambda x_{air} + dx_{glass}/\lambda x_{glass}) = (T_{air} - T_{coil}) \quad (4)$$

where
$\lambda_{1mica}$: thermal conductivity of the mica layer in the high thermal conductivity insulation system [W/m·K], $\lambda_{2mica}$: thermal conductivity of the mica layer in the conventional insulation system [W/m·K],
$\lambda x_{pet}$: thermal conductivity of the heat-shrinkable material [W/m·K],
$\lambda x_{pps}$: thermal conductivity of a high thermal conductivity material (PPS as an example) [W/m·K],
$\lambda x_{air}$: thermal conductivity of a gap [W/m·K],
$\lambda x_{glass}$: thermal conductivity of a glass fiber tape [W/m·K],
$dx_{1mica}$ insulation thickness of the mica layer in the high thermal conductivity insulation system [m],
$dx_{2mica}$: insulation thickness of the mica layer in the conventional insulation system [m],
$dx_{pet}$: insulation thickness of the heat-shrinkable material [m],
$dx_{pps}$: insulation thickness of the high thermal conductivity material (PPS as an example) [m],
$dx_{air}$: insulation thickness of the gap [m], and
$dx_{glass}$ insulation thickness of the glass fiber tape [m].

Assuming the temperature difference is the same in both systems, if the above invention is used, it is possible to cool down a heat generating element having 1.6 times the amount of heat to about the same temperature as in the case of the conventional insulation.

In other words, assuming that the values $T_{air} - T_{coil}$ are equal in the formulae (3) and (4)

$$dQ_1/dQ_2 \approx 1.6,$$

where
$\lambda_{1mica} = 0.6$ [W/m·K], $\lambda_{2mica} = 0.4$ [W/m·K], $\lambda x_{pet} = 0.5$ [W/m·K], $\lambda x_{pps} = 28.5$ [W/m·K], $\lambda x_{air} = 0.02$ [W/m·K], $\lambda x_{glass} = 1.0$ [W/m·K], $dx_{1mica} = 2$ [mm], $dx_{2mica} = 2$ [mm], $dx_{pet} = 0.1$ [mm], $dx_{pps} = 0.1$ [mm], $dx_{air} = 0.02$ [mm], and $dx_{glass} = 0.1$ [mm].

As described above, the example of the present invention improves the cooling performance of a coil end portion.

INDUSTRIAL APPLICABILITY

The present invention is applicable not only to a stator coil in a generator but also to a rotating electrical machine coil.

REFERENCE SIGNS LIST 10, 110 stator coil
11, 111 wire
12, 112 wire insulation layer
13, 113 interlayer insulation layer
14, 114 main insulation layer
15 outer-layer insulation layer
115 first outer-layer insulation layer
116 second outer-layer insulation layer

The invention claimed is:
1. A rotating electrical machine coil in which a main insulation layer is arranged on an outer circumferential side of a plurality of wires, wherein
the main insulation layer is formed by winding a highly thermally conductive mica tape,
a first outer-layer insulation layer made of a heat-shrinkable material is formed on an outer circumferential surface of the main insulation layer at a coil end portion of the coil, and
a second outer-layer insulation layer made of a highly thermally conductive resin material is formed on an outer circumferential surface of the first outer-layer insulation layer at the coil end portion of the coil,
wherein a thermal conductivity of the highly thermally conductive mica tape is 0.4 to 1.2 W/mK, wherein the highly thermally conductive resin material comprises at least one of (1) liquid crystal polymer or (2) a material in which a resin material is mixed with aluminum oxide.

2. The rotating electrical machine coil according to claim 1, wherein
the highly thermally conductive mica tape is a mica tape including at least one of hexagonal boron nitride, aluminum oxide, beryllium oxide, magnesium oxide, aluminum nitride, or silicon carbide.

3. The rotating electrical machine coil according to claim 1, wherein
the heat-shrinkable material is a heat-shrinkable polymer material tape.

* * * * *